Jan. 29, 1924.

G. E. GASTER 1,482,125

COMBUSTION CONTROLLING SYSTEM

Filed June 12, 1923    2 Sheets-Sheet 1

Inventor
George E. Gaster

By Edward C. Sasnett
Attorney

Jan. 29, 1924.

G. E. GASTER 1,482,125

COMBUSTION CONTROLLING SYSTEM

Filed June 12, 1923  2 Sheets-Sheet 2

Inventor
George E. Gaster

By Edward C. Sasnett
Attorney

Patented Jan. 29, 1924.

1,482,125

UNITED STATES PATENT OFFICE.

GEORGE E. GASTER, OF CHICAGO, ILLINOIS.

COMBUSTION-CONTROLLING SYSTEM.

Application filed June 12, 1923. Serial No. 644,996.

*To all whom it may concern:*

Be it known that GEORGE E. GASTER, a citizen of the United States, and a resident of Chicago, in the county of Cook and State of Illinois, has invented certain new and useful Improvements in Combustion-Controlling Systems, of which the following is a specification.

The present invention relates to combustion controlling systems for furnaces, and particularly to automatic systems of this kind. This invention has for its object to provide a system by means of which the draft of a furnace is made to respond accurately and continuously to the composition of the products of combustion with respect to the $CO_2$ content thereof, whereby the combustion may be regulated automatically to effect maximum efficiency of fuel consumption.

A furnace will operate at its highest efficiency with respect to fuel consumption when the percentage content of $CO_2$ in the products of combustion is maintained within predetermined narrow limits. The object of my present invention, therefore, is to produce a system which will respond accurately to the $CO_2$ content of the combustion gases and will be continuously sensitive to variations of such content and will instantly affect the draft on the occurrence thereof, thereby maintaining the $CO_2$ content substantially constant.

I am aware that it is broadly old to control the draft of a furnace automatically by the $CO_2$ content of the furnace gases, but in all of these prior systems of which I have knowledge the control of the draft is intermittent, and the operation of the damper or other controlling device occurs a substantial length of time subsequently to the existence of the controlling conditions. In these intermittent systems, therefore, the composition of the furnace gases at the time the draft regulating device is operated may be substantially different from the condition which governed said regulating device and set it in operation. The draft regulation of these prior systems is poor and the efficiency of fuel consumption is substantially below the maximum obtainable. In the system of the present invention, on the other hand, the draft controlling means operates substantially in synchronism with the variations of the furnace gases with respect to the $CO_2$ content thereof, and the operation of the controlling device is rendered accurately proportional to the variations.

I will fully explain the nature and advantages of my invention by reference to the accompanying drawings which illustrate a preferred embodiment.

Figure 1:
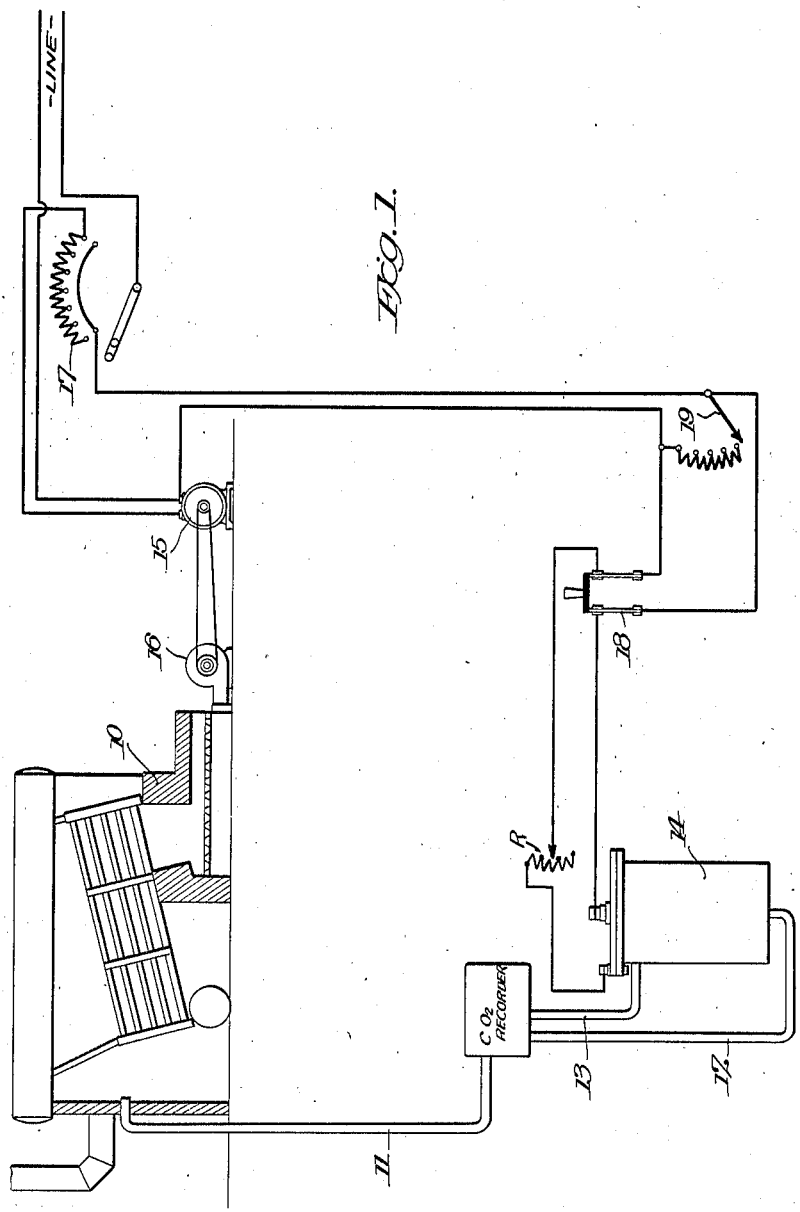
Fig. 1 is a diagrammatic view showing the connected elements of the system.

Fig. 1 shows the system applied to the regulation of a furnace for boilers. Numeral 10 designates the furnace and 11 designates a pipe for conducting a portion of the flue gases to a $CO_2$ responsive device. The $CO_2$ responsive device which I propose to use is of the type which gives continuous control, that is, I propose to use a $CO_2$ responsive device that is continuously responsive to the $CO_2$ content of the combustion gases and controls continuously the draft of the furnace in accordance therewith. Preferably I employ a $CO_2$ responsive device by which a pressure difference is continuously produced varying with the percentage of $CO_2$. The Uehling $CO_2$ recorder is a good example of the kind of $CO_2$ responsive device which I prefer to use in my system.

Figure 2:
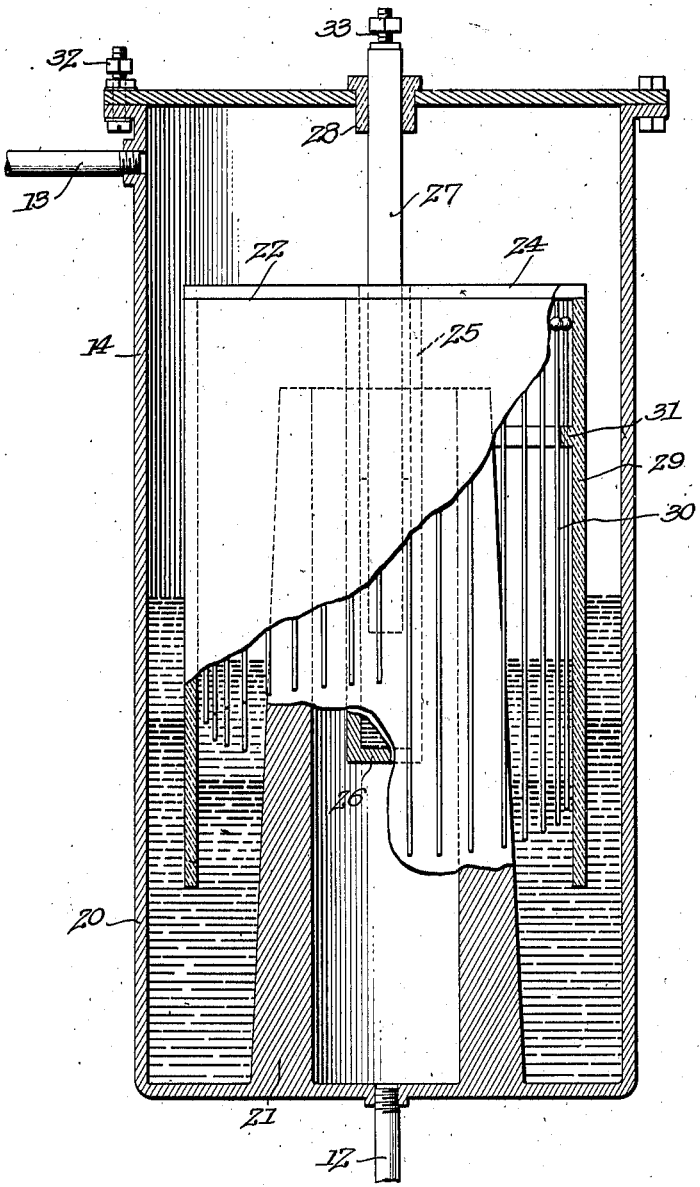
Fig. 2 is a vertical section, partly in elevation, of a liquid rheostat employed to control the electrically operated draft device of the system.

The high and low pressure chambers of the $CO_2$ recorder are connected by the pipes 12 and 13, respectively, to a liquid rheostat 14, the construction of which is shown by Fig. 2. This rheostat is adapted to be inserted in the field circuit of a shunt motor 15, so as to automatically vary the speed of the motor proportionately to the variations of $CO_2$ content of the flue gases. The motor has a driving connection with a blower 16 which supplies the furnace draft. The motor starting switch is designated by the numeral 17, and 18 designates a switch by means of which the automatically operated rheostat may be cut out, so as to permit manual control of the draft when desired. When switch 18 is open, the motor speed may be controlled by a manually operated rheostat 19. The system also includes an adjusting rheostat R, the function of which will be pointed out hereinafter.

In an automatic combustion controlling system, accuracy in the responsiveness of the draft to the combustion conditions is essential to the attainment of the best efficiency of fuel consumption. One of the important features of my invention is its accuracy in this respect, and this accuracy is principally due to the kind of rheostat which I employ. This rheostat is of the liquid type and was designed by me particularly for use in this system. It is adapted to vary with continuity and great accuracy the resistance of the motor field circuit in accordance with the variations of pressure produced by the $CO_2$ recorder.

Fig. 2 illustrates the specific construction of the rheostat. It comprises an air tight metallic casing 20 preferably of circular cross section. Attached to the bottom of this casing in any suitable manner is a member 21, which has a cylindrical interior opening at its upper end, the said member being disposed coaxially with casing 20 and projecting substantially beyond the mid point of the casing. Disposed in coaxial relation with member 21 is an inverted cup member 22, the lower end of which is open and which has its upper end closed by a metallic plate 24. The plate 24 has formed therewith a tubular member 25 of relatively small cross section projecting downwardly a substantial distance into the cylindrical interior of member 21. The lower end 26 of tubular member 25 is closed and the upper end thereof opens through a central aperture in plate 24. A conducting rod 27 is secured in an insulating bushing 28 which is mounted in a central aperture formed in the cover of casing 20. Rod 27 projects down into the tubular member 25, and the latter holds a sufficient quantity of mercury to form a good contact with rod 27 at all positions of cup 22. The body 29 of the cup member is composed of suitable insulating material, for example, bakelite. A complete circular series of resistance wires 30 are supported in the inverted cup member 22 by means of an annular rib 31 which is formed in said member near the top thereof. The upper ends of these wires are connected to the metallic plate 24, and the lower ends thereof define a spiral, the wires progressively decreasing in length from the wire of maximum length to the wire of minimum length, as clearly shown by the drawing. The annular space between the inner walls of casing 20 and the periphery of member 21 contains a suitable quantity of mercury and a covering layer of transformer oil. The high pressure pipe 12 communicates with the interior of member 21, while the low pressure pipe 13 opens into the upper part of casing 20. One terminal of the rheostat is a binding screw 32 which is one of the screws for fastening the cover of casing 20, and the other terminal is a binding screw 33 which is screwed in the upper end of rod 27. The electrical path through the rheostat includes binding screw 32, the metallic casing 20, the mercury, those resistance wires 30 which project into the mercury, the metallic plate 24, the tubular member 25, the mercury in said member, the conducting rod 27 and the binding screw 33.

The system above described operates in substantially the following manner:—The switch 18 and the starting switch 17 being in closed position and the rheostat switch 19 being open, the motor is rotating at a certain speed depending upon the position of the cup 22 of the rheostat with respect to the mercury therein, such position determining the resistance in the field circuit of the motor. The $CO_2$ recorder, as before pointed out, is continuously responsive to the per cent content of $CO_2$ in the flue gas and continuously produces a difference of pressure in the rheostat proportional thereto. Now if the $CO_2$ content in the flue gas falls below a certain pre-determined value, the difference between the pressures inside and outside the cup 22 will decrease. Consquently the level of mercury in the cup will rise and that outside the cup will fall and the cup itself will move down with respect to a stationary point. This downward movement of the cup and upward movement of the mercury level in the cup will cause more of the resistance wires to project into the mercury, thereby lowering the resistance of the motor field circuit and causing more current to flow through the field coils, lowering the speed of the motor. The draft will thus be reduced and the $CO_2$ content of the flue gas will increase to the normal pre-determined value. When the per cent of $CO_2$ rises above the pre-determined value, the difference of pressure in the rheostat increases, the level of mercury in the cup 22 falling and that outside the cup rising, and the cup itself moving upward with respect to a stationary point. This upward movement of the cup and downward movement of the mercury level therein will cause a wire or a number of wires, as the case may be, to be withdrawn from the mercury, which will increase the resistance in the motor field circuit and cause the motor and fan to speed up. More air will be supplied to the furnace and consequently the $CO_2$ content of the flue gas will decrease to the predetermined value. It should be noted that the differences of pressure in the rheostat operate to move the contacts relatively to a stationary point and also to change the level of the mercury, the contacts and mercury moving in opposite directions. This makes the rheostat very sensitive to changes in the pressure produced by the $CO_2$ recorder and consequently very sensitive to changes in the $CO_2$ content of the flue gases.

I also obtain great accuracy in the working of the system because of the use of a rheostat of the liquid type. A rheostat of the metallic contact type is very liable to give inaccurate results when used in a system of this kind, as the contacts are likely to become loose or corroded. By using a liquid rheostat I eliminate errors arising from these or other causes.

In order to adjust the system to different conditions of fuel etc., I prefer to use the auxiliary or adjusting rheostat R. By means of this rheostat the system can be very easily adjusted manually to suit any condition. For example, suppose that the system is maintaining the $CO_2$ per cent at about 11% and because of change of fuel or other reason, it is desired to increase the per cent to 14% approximately. To do this it is only necessary to manually adjust the rheostat R in a direction to increase the fixed resistance in the field circuit of the motor, thus causing the motor to operate at lower speeds with respect to given positions of the automatic rheostat, decreasing the air supply and raising the $CO_2$ per cent to the desired predetermined value. After being adjusted for any given condition the system will operate indefinitely without requiring further attention.

Now having particularly described the specific structure of a system embodying my invention, without intending thereby to limit the scope of the invention, what I claim as new and desire to secure by Letters Patent of the United States is:

1. A combustion controlling system comprising a furnace, means continuously responsive to the $CO_2$ content of the flue gases, a liquid rheostat continuously responsive to said means, and an electrically operated blower supplying the draft of the furnace controlled by said rheostat.

2. A combustion controlling system comprising a furnace, means continuously responsive to the $CO_2$ content of the products of combustion, a rheostat continuously responsive to said means, and an electrically operated blower supplying the draft of the furnace controlled by said rheostat.

3. A combustion controlling system comprising, in combination with a furnace, a $CO_2$ recorder which produces a pressure difference varying proportionately to the $CO_2$ content of the products of combustion, a liquid rheostat having movable contacts responsive to said pressure difference, and an electrically operated blower supplying the furnace draft controlled by said rheostat.

4. A combustion controlling system comprising, in combination with a furnace, a $CO_2$ recorder producing a pressure difference which varies proportionately to the $CO_2$ content of the combustion products, a liquid rheostat comprising a movable member subjected to said pressure difference and responsive thereto, said movable member having mounted thereon a series of wires of different lengths adapted to project into the conducting liquid of said rheostat to vary the resistance of the electrical path therethrough, and an electrically operated blower supplying the furnace draft controlled by said rheostat.

5. A combustion controlling system comprising, in combination with a furnace, a rheostat including a casing having a centrally disposed hollow member projecting upwardly from the bottom thereof and having an open upper end, said casing containing a suitable quantity of mercury in the space between the walls thereof and the periphery of said hollow member, an inverted-cup member disposed over said hollow member having a series of wires of different lengths adapted to project into said mercury, means for creating a difference of pressure between the interior and exterior of said inverted-cup member varying in proportion to the $CO_2$ content of the combustion products, a fan controlling the draft of the furnace, and an electric motor driving said fan and controlled by said rheostat.

6. A combustion controlling system comprising, in combination with a furnace, a pneumatically operated rheostat including a body of mercury and an inverted cup projecting below the level of said mercury having mounted thereon a number of wires of different lengths adapted to project into said mercury to vary the resistance of the electrical path in the rheostat, means for creating a difference of pressure on the inside and outside of said cup varying in proportion to the $CO_2$ content of the combustion products, a fan controlling the draft of the furnace, and an electric motor driving said fan and controlled by said rheostat.

7. A combustion controlling system comprising, in combination with a furnace, a pneumatically operated liquid rheostat, means for continuously producing an operating pressure difference in said rheostat varying proportionately to the $CO_2$ content of the combustion products, a fan controlling the draft of the furnace, and an electric motor driving said fan and controlled by said rheostat.

8. A system for controlling the combustion of furnaces, comprising means continuously responsive to the $CO_2$ content of the flue gases, a liquid rheostat continuously responsive to said means, a motor operated blower supplying the draft of the furnace controlled by said rheostat, and an auxiliary rheostat for adjusting the fixed resistance of the motor circuit to adjust the system to different fuel conditions.

9. A combustion controlling system comprising, in combination with a furnace, a pneumatically operated liquid rheostat, means for continuously producing an operating pressure difference in said rheostat varying proportionately to the $CO_2$ content of the combustion products, a fan controlling the draft of the furnace, an electric motor driving said fan and controlled by said rheostat, and an auxiliary rheostat for independently controlling the speed of the motor In testimony whereof I hereunto affix my signature.

GEORGE E. GASTER.